United States Patent
Agrawal et al.

(10) Patent No.: US 9,423,281 B2
(45) Date of Patent: Aug. 23, 2016

(54) SELF-CALIBRATING SINGLE TRACK ABSOLUTE ROTARY ENCODER

(71) Applicant: Mitsubishi Electric Research Laboratories, Inc., Cambridge, MA (US)

(72) Inventors: Amit Agrawal, Somerville, MA (US); Jay Thornton, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 487 days.

(21) Appl. No.: 13/899,025

(22) Filed: May 21, 2013

(65) Prior Publication Data
US 2013/0253870 A1 Sep. 26, 2013

Related U.S. Application Data

(63) Continuation-in-part of application No. 13/367,549, filed on Feb. 7, 2012, now abandoned.

(51) Int. Cl.
| | |
|---|---|
| *G01D 5/244* | (2006.01) |
| *G01D 18/00* | (2006.01) |
| *G01D 5/245* | (2006.01) |
| *G01D 5/347* | (2006.01) |

(52) U.S. Cl.
CPC ............ *G01D 18/00* (2013.01); *G01D 5/2455* (2013.01); *G01D 5/24452* (2013.01); *G01D 5/34792* (2013.01)

(58) Field of Classification Search
CPC ................................................ G01D 5/24452

USPC ......................................................... 702/150
See application file for complete search history.

(56) References Cited

U.S. PATENT DOCUMENTS

| | | | |
|---|---|---|---|
| 5,138,564 | A | 8/1992 | de Jong |
| 6,145,368 | A | 11/2000 | Klein |
| 6,215,119 | B1 | 4/2001 | Markham |
| 6,598,196 | B1 | 7/2003 | Bussard |
| 7,143,518 | B2 | 12/2006 | Watanabe |
| 7,499,827 | B2 | 3/2009 | Gordon-Ingram |
| 7,825,367 | B2 | 11/2010 | Nakamura et al. |
| 8,250,901 | B2 | 8/2012 | Davis |

(Continued)

FOREIGN PATENT DOCUMENTS

| | | |
|---|---|---|
| CN | 1461404 A | 12/2003 |
| CN | 101341378 A | 1/2009 |

(Continued)

OTHER PUBLICATIONS

Lu X et al. "Self-Calibration of On-Axis Rotary Encoders," Cirp Annals, Elsevier BV, NL, CH, FR, vol. 56, No. 1, Jan. 2007. pp. 499-504.

(Continued)

*Primary Examiner* — Bryan Bui
(74) *Attorney, Agent, or Firm* — Gene Vinokur; James McAleenan; Hironori Tsukamoto (57) ABSTRACT

A rotary encoder includes a single read-head and a circular scale. The encoder is self-calibrated by acquiring calibration samples with the read-head for rotational angles of the circular scale, and estimating spatial frequency and spatial distortion parameters of the encoder from the calibration samples.

20 Claims, 12 Drawing Sheets

(56) References Cited

U.S. PATENT DOCUMENTS

| | | |
|---|---|---|
| 2004/0173735 A1 | 9/2004 | Williams et al. |
| 2006/0043964 A1 | 3/2006 | Watanabe et al. |
| 2009/0030638 A1 | 1/2009 | Lu |
| 2010/0181468 A1 | 7/2010 | Nakamura et al. |
| 2011/0316527 A1 | 12/2011 | Dolsak et al. |
| 2012/0222465 A1 | 9/2012 | Lippuner et al. |
| 2012/0245876 A1 | 9/2012 | Watanabe |
| 2012/0283978 A1 | 11/2012 | Watanabe |
| 2013/0124128 A1* | 5/2013 | Yamazaki .......... G01D 5/24452 702/92 |

FOREIGN PATENT DOCUMENTS

| | | |
|---|---|---|
| DE | 102006059491 B3 | 4/2008 |
| GB | 2395002 A | 12/2004 |
| WO | 02084223 A1 | 10/2002 |

OTHER PUBLICATIONS

Masuda et al. "High accuracy calibration system for angular encoders," J. Robotics and Mechatronics, 5(5), 448-452, 1993.

* cited by examiner

SELF-CALIBRATING SINGLE TRACK ABSOLUTE ROTARY ENCODER

RELATED APPLICATION

This application is a Continuation-in-Part of a parent U.S. application Ser. No. 13/367,549, "Method for Estimating Positions Using Absolute Encoders," filed by Agrawal on Feb. 7, 2012, incorporated herein by reference.

FIELD OF THE INVENTION

This invention relates to measuring devices and in particular to absolute rotary encoders for measuring absolute angle of rotation.

BACKGROUND OF THE INVENTION

Accurate estimation of linear positions and rotational angles is an important task in industrial automation, and similar applications. Devices, such as numerically controlled (CNC) machines, drill bits, robot arms or laser cutters, and assembly lines need precise measurements. Feedback control is often used for precision measurements.

Typical encoders include a scale and a read-head. Optical encoders are typically used to measure absolute or relative linear positions or rotational angles. Relative encoders measure the relative position or angle within a period of the scale, and require counting the number of scale periods traversed to determine the absolute position or angle. Absolute encoders do not require memory or power to store the current position or angle, and can obtain these at any time, particularly at start-up.

Optical encoders can be linear or rotary. A linear encoder measures a position, and a rotary encoder measuring an angle. Conventional absolute rotary encoders typically use multiple tracks and apply sine-cosine based interpolation method to achieve high resolution.

A single track absolute linear encoder that uses a single scale and a single CCD/CMOS sensor is described in the parent Application. That encoder does not use the conventional sine-cosine based interpolation method. Instead, that encoder detects edges, or zero-crossings, in a scan-line, and fits a model to the edge positions to obtain high resolution absolute position information. That encoder acquires a 1D image of the linear scale with a linear read-head.

High accuracy rotary encoders are required in precise, machining and manufacturing equipment. However, several errors can be introduced in the rotary encoder during manufacturing. These include errors in the scale pattern, installation of the scale on a rotary shaft, read-head alignment, and noise in electrical circuits.

For rotary encoders, the spacing between the scale lines varies due to the circular nature, of the scale. Another source of errors is eccentricity induced when the scale on a rotary disc is arranged on a rotary shaft. In addition, out-of-plane motion (wobble), and misalignment in installation can also lead to variation of the distance between the read-head and the scale. These factors affect the overall accuracy of rotary encoders. The encoder can correct manufacturing variations, errors in the scale pattern, installation of the scale on the rotary shaft, read-head alignment, and noise in electrical circuits. During operation, temperature variations and mechanical vibrations can cause further distortions, further reducing accuracy.

Due to the being closer to the light source, the center of the sensor receives more light compared to the sides. This results in vignetting, where the acquired 1D image is brighter in the center and darker on the sides. Vignetting leads to errors in detected zero-crossings (edges), thereby reducing the overall accuracy.

Several previous methods require multiple additional read-heads to cancel out errors due to eccentricity. For example, see U.S. Pat. No. 6,215,119, and U.S. Pat. No. 7,143,518. An equally divided average (EDA) method is described, by Masuda et al. in "High accuracy calibration system for angular encoders," J. Robotics and Mechatronics, 5(5), 448-452, 1993. Rotary encoders that use multiple read-heads to reduce eccentricity errors increase the cost of the system and make the system design cumbersome.

Conventional methods also require precise motion of rotating parts for self-calibration. For example, U.S. Pat. No. 5,138,564 discloses a method that moves the encoder at slow speed and fast speed for calibration. U.S. Pat. No. 6,598,196 drives the servo system on a predetermined trajectory such that encoder errors occur at frequencies outside the servo feedback loops. Such requirements increase calibration effort and time.

U.S. Pat. No. 7,825,367 describes a self-calibrating rotary encoder where angular differences are determined as a Fourier series. Sine-cosine interpolation based rotary encoders can be calibrated as described in U.S. Pat. No. 8,250,901. The voltage data corresponding to sine and cosine of the rotation angle is fitted to an ellipse. Linear calibration parameters are obtained by transforming the ellipse into a circle.

U.S. Pat. No. 7,825,367 describes a rotary encoder capable self-calibration. The rotary encoder includes a rotary disk with an angle code, a light source, and a linear sensor (CCD) that reads the angle code. A processing unit acquires reading values $f(\theta)$ for predetermined angles. A difference between reading values $f(\theta+\phi)$ and $f(\theta)$ within a reading range on the linear sensor is $g(\theta, \phi)$. The difference is determined as a Fourier series. There, the rotation angle $\theta$ at a location is obtained by analyzing the CCD image. The self-calibration is based on finding the rotation angle at two different locations, and analyzing the difference for use in the self-calibration.

SUMMARY OF THE INVENTION

The embodiments of the invention provide a self-calibrating, single track, single read-head absolute rotary encoder. The encoder acquires measurements over one full rotation (360°) or part of a full rotation. Hence, the encoder compensates for any errors or distortions introduced during manufacturing and later use as environmental or mechanical conditions change. The encoder can also compensate for vignetting due to illumination variations.

The embodiments do not require multiple read-heads to cancel eccentricity errors. This significantly reduces the cost and complexity of the encoder. In addition, the embodiments do not require moving the motor at multiple speeds, or pre-determined trajectories for calibration. In addition, the invention also corrects for other installation errors, such as change of gap and shaft wobble.

DETAILED DESCRIPTION OF THE PREFERRED EMBODIMENTS

The embodiments of the invention provide a single track absolute rotary encoder. A read-head can be a linear charge-coupled device (CCD) or a complementary metal-oxide-semiconductor (CMOS) to acquire 1D images of a rotating circular scale. The 1D image includes a linear array of pixels. The scale includes reflecting and non-reflecting regions arranged according to a de Bruijn sequence. The de Bruijn sequence is well suited, because the pattern itself is circular in nature.

Absolute Circular Scale

FIG. 1 shows a small portion of a circular scale 100 of an absolute encoder for one embodiment of our invention. Details of the scale are described in U.S. application Ser. No. 13/100,092. The scale is used to determine a high-resolution phases P 120.

Figure 1A:
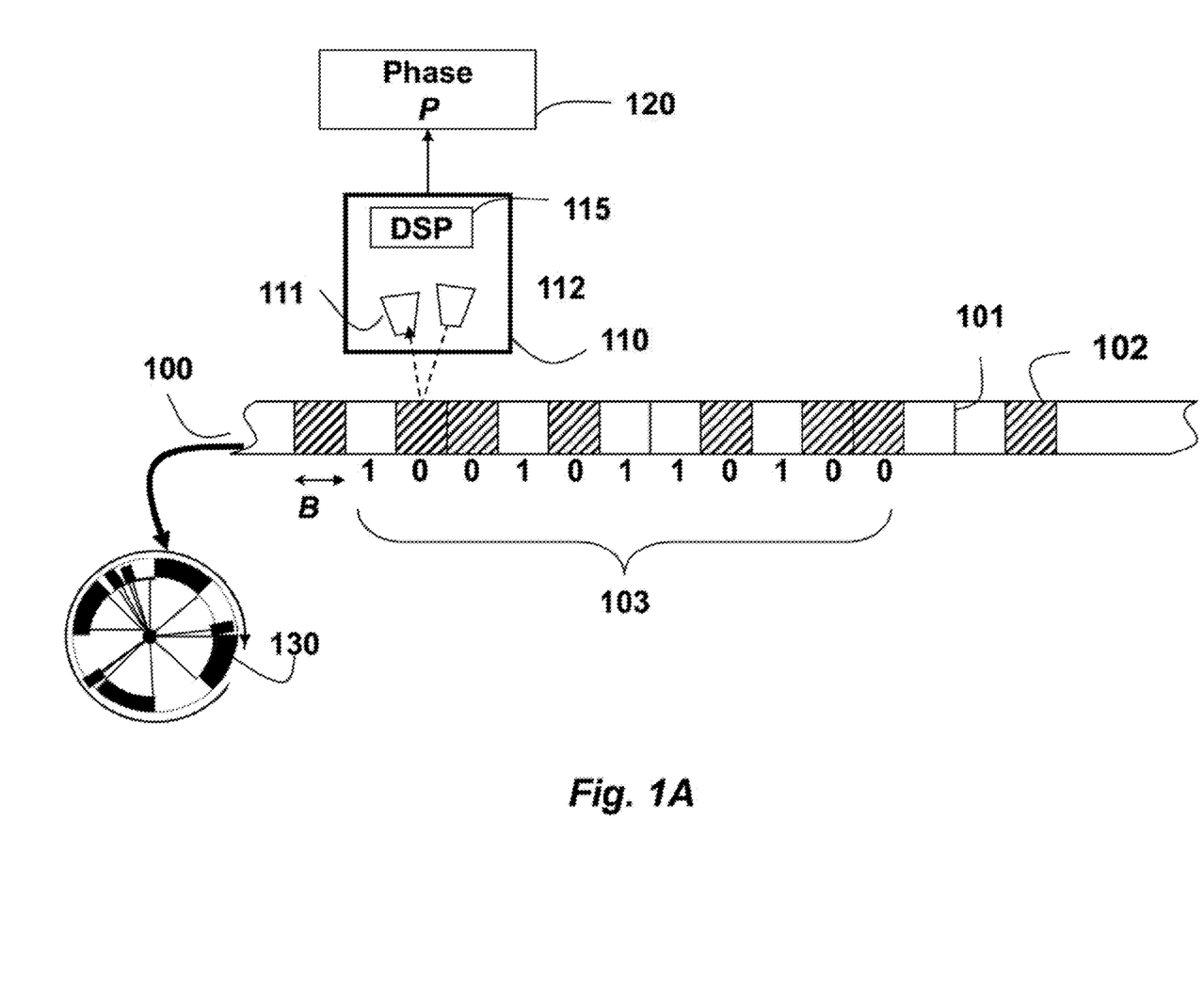
FIG. 1A is a schematic of a rotary encoder according to embodiments of the invention.

The scale can include alternate light reflecting 101, and non-reflecting 102 marks or bits. The marks can also alternate between opaque and transparent, depending on a relative position of the light source with respect to the read-head. Each mark is B microns wide, which the scale resolution. The width B of each mark is a half-pitch. In one embodiment, B is 20 microns. Because of the relative small size of the marks, the example marks shown, in the figures are not to scale.

A read-head 110 is mounted at some distance and parallel to the scale. The read-head includes a sensor 111, a (LED) light source 112, and an optional lens. The sensor can be a detector array of N sensors, e.g., N can be 512. The array can be complementary metal-oxide-semiconductor (CMOS) or charge coupled device (CCD). The read-head also be associated with a digital signal processor 115 connected to sensor and a memory. It is understood that other types of processors can be used.

The marks or bits on the example scale 100 can be arranged on a rotatable disk 130 or shaft. The only requirement is that the marks are arranged sequentially for a particular code or non-periodic sequence.

Figure 1B:
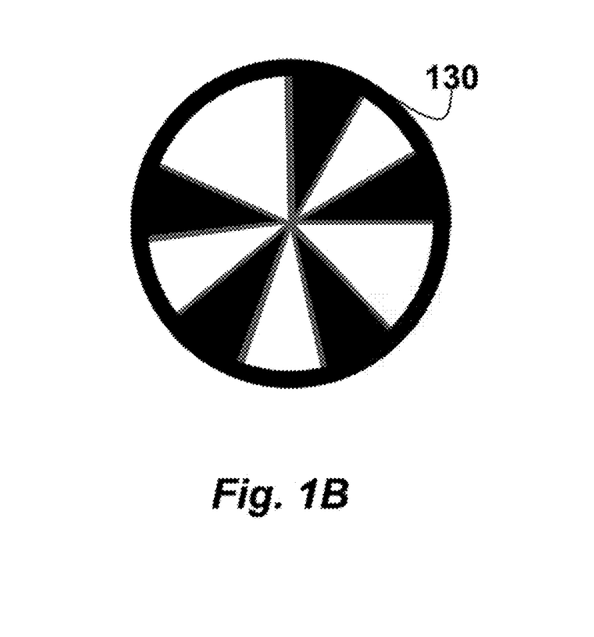
FIG. 1B is a schematic of a circular scale of sectors according to embodiments of the invention.
Figure 1C:
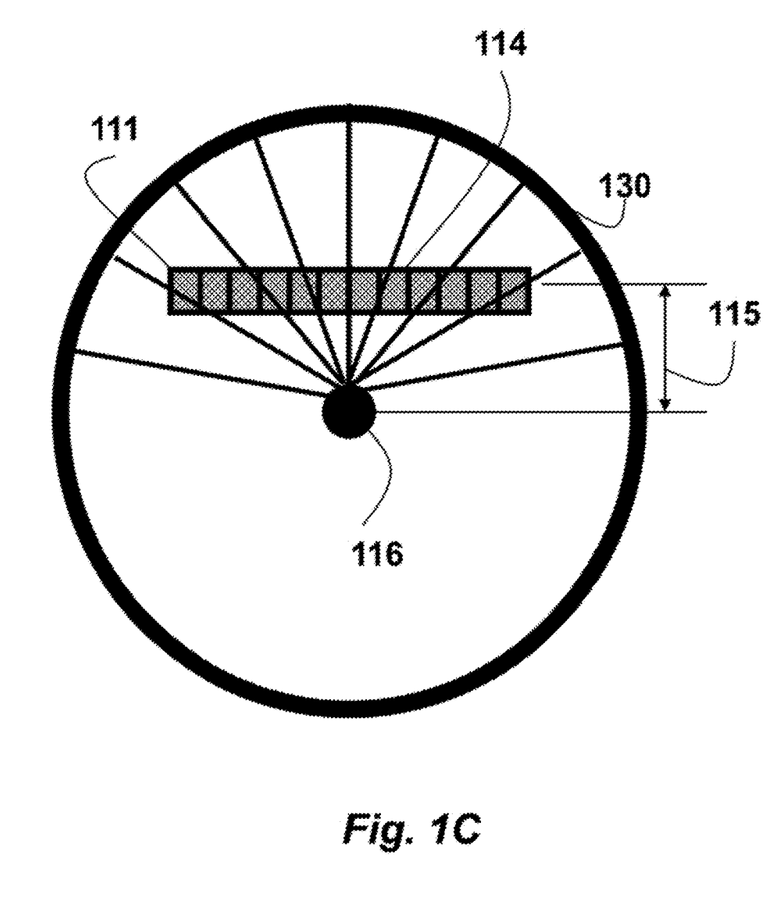
FIG. 1C is a schematic of the circular scale and a linear read-bead according to embodiments of the invention.

As shown in FIGS. 1B and 1C, the marks are arranged as sectors of a circle on the scale 130. The read-head 111 includes a linear array of sensors 114. Here, the read-head is centered tangentially at an offset 115 with respect to the center of rotation 116. Therefore, it is noted that sensor pixels near either end of the linear read-head observe a wider part of the sectors than the sensors near the center of the read-head. This leads to a distortion of the signal on the 1D sensor.

Calibration

Figure 1D:
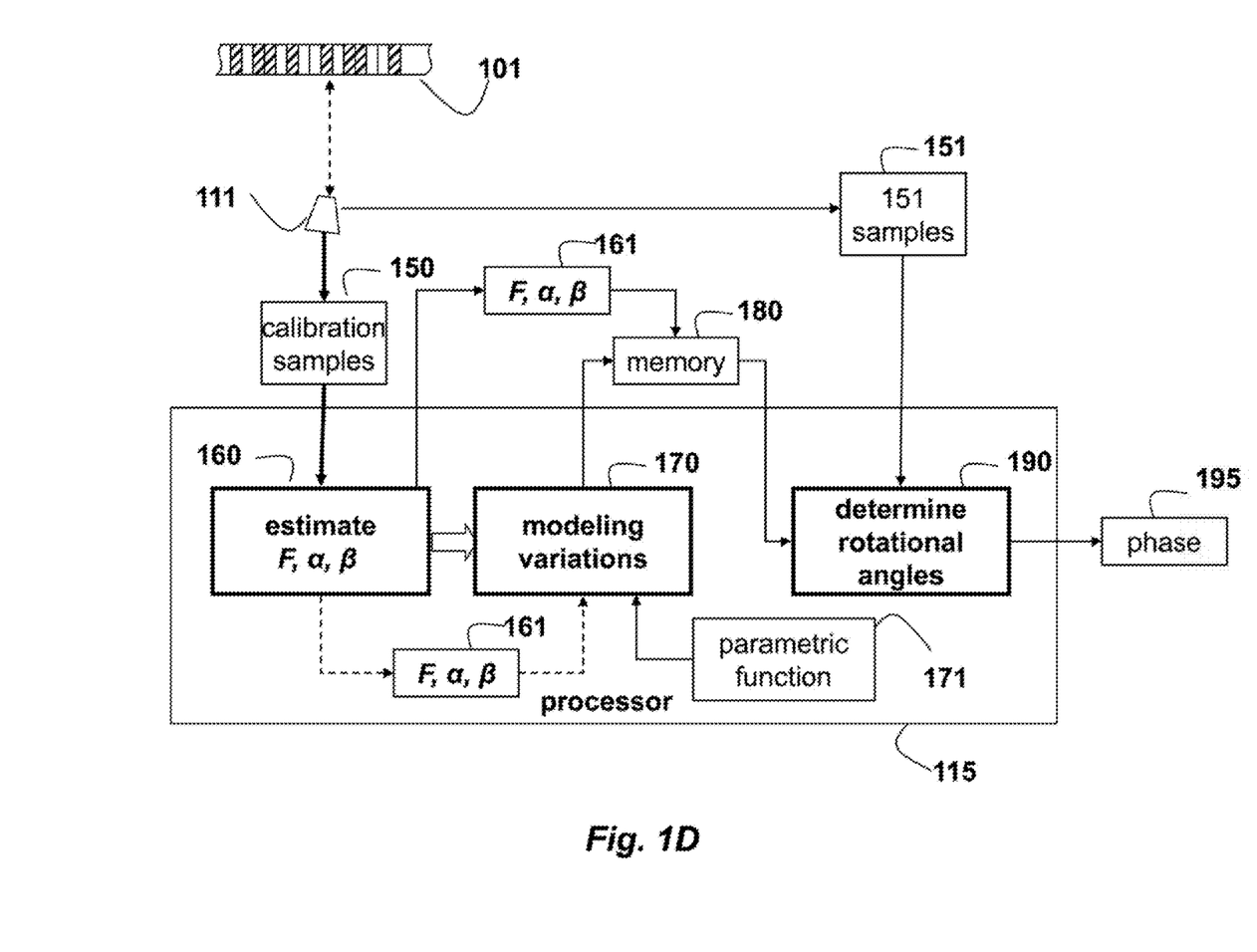
FIG. 1D is a block diagram for calibrating the encoder of FIG. 1A according to embodiments of the invention.

The DSP performs calibration of the encoder as shown in FIG. 1D. The calibration can be performed offline, periodically or continuously during operation of the encoder.

During calibration, calibration samples 150 are acquired by the read-head 111 for rotational angles of the circular scale 101 for a full rotation of 360°, or some partial rotation. The partial rotation can be useful where the scale oscillates circularly instead of undergoing full rotations. Note that calibration samples can also be acquired for multiple rotations.

Frequency F, and distortion parameters $\alpha$ and $\beta$ 161 are estimated 160 from the calibration samples. The frequency F, and distortion parameters $\alpha$ and $\beta$ can be directly stored in a memory, e.g., as a look-up table, and are sufficient to accurately determine phases of the encoder during operation. The table look-up may be advantageous if the look-up is fast, or takes less time and memory than evaluating the parametric function.

For convenience, we model 170 variations in the frequency F and distortion parameters $\alpha$ and $\beta$ using a parametric function 171, and store the variations in the memory for use during the online real-time operation of the encoder.

Real-Time Operation

During real-time operation, a phase 195 of the encoder is determined 190 from test samples 151 and the modeled variations in the frequency F and distortion parameters $\alpha$ and $\beta$. It should be understood that the variations can be obtain from the raw parameters stored in the memory as a look-up table during operation. It is understood that the parameters can also be acquired during real-time operation of the encoder.

The details of the encoder structure and calibration are now described in greater detail.

De Bruijn Sequence

To achieve 100% information density on the scale, a bit sequence is used. Every subsequence has a finite length and is unique, e.g., a de Bruijn sequences 103. Each unique sequence corresponds to a coarse phase angle. It is an object of the invention to self-calibrate the encoder so that a line or precise angle is obtained.

A k-ary de Bruijn sequence B(k, n) of order n is a cyclic sequence of a given alphabet (number of angles) with size k, for which every possible subsequence of length n in the alphabet appears as a sequence of consecutive characters exactly once. If each B(k, n) has a length $k^n$, then there are $(k!^{k^{(n-1)}})/k^n$ distinct de Bruijn sequences B(k, n). When the sequence is truncated from front or back, the resulting sequence also has the uniqueness property with the same n. It should be noted that any non-periodic sequence with non-repeating subsequences can be used.

The detector array requires a field of view (FOV) of at least n bits for decoding to be possible. For the half-pitch B=20 microns and using the de Bruijn sequence of order 16 requires that the FOV is 16×20=320 microns on the scale. In one embodiment, the field of view is designed to be 1-2 mm to have the desired accuracy.

For Nyquist sampling, each bit of the sequence, i.e., each half-pitch of the scale, maps to at least two pixels in the linear detector array. This requires at least 16×2=32 pixels, which is well-below the number of pixels in conventional sensors. To handle optical aberrations, such as defocus blur or diffraction, the number of pixels per half-pitch can be increased.

Because the scale is circular, the reflecting and non-reflecting regions are equi-angular and not equi-distance when using a linear sensor, see FIG. 1C. Due to the circular scale, the width of reflecting/non-reflecting regions increases at the both ends of the sensor. Thus, the spatial frequency F is not constant along the sensor, Let z(i) be the detected zero-crossings (edge locations), P be the phase angle, and F be the frequency. Let k(i) be the number of bits between two successive zero-crossings z(i) and z(i+1). If we define $$c(i) = \sum_{j=1}^{i-1} k(j),$$

then the $i^{th}$ zero-crossings of the rotary encoder can be written as a cubic model of c(i)

$$z(i)=P+Fc(i)+\alpha c(i)^2+\beta c(i)^3,$$

wherein parameters of the cubic model include the phase P, the spatial frequency F, and spatial distortion parameters $\alpha$ and $\beta$. This model accounts for the error due to non-uniform spacing of scale lines on the circular disk 130. Using N zero-crossings, N equations are obtained. For example, If there are N zero-crossings, z(1), . . . , z(20), then corresponding c(1), . . . , c(20) are known. These equations describe a linear system in unknowns P, F, $\alpha$ and $\beta$. We solve the linear system to obtain the values of P, F, $\alpha$ and $\beta$.

The angle of rotation $\theta$ is obtained using $\theta$=P/F*360/K+ Coarse_Position, where K is the number of gradations in the scale and Coarse_Position is the phase angle based only on the underlying code subsequence al the image. For example, K can be 1024

Self-Calibration

The estimated parameters F, $\alpha$ and $\beta$ 161 are expressed in terms of the actual rotary angle $\theta$ as F($\theta$), $\alpha$($\theta$), and $\beta$($\theta$). The embodiments considers the variations in the three parameters F($\theta$), $\alpha$($\theta$), $\beta$($\theta$). Due to imaging noise, there is a small variation (normal variation) in these parameters.

In the absence of any mechanical errors in mourning and any eccentricity error, the variation in these parameters should be normal variation over a one full rotation or part thereof, as $\theta$ varies from 0 to 360 degrees. However, due to eccentricity, wobble or gap change (the distance between the read-head and the scale), the spatial parameters F($\theta$), $\alpha$($\theta$), $\beta$($\theta$) show a large variation than can be attributed to noise.

Figure 2:
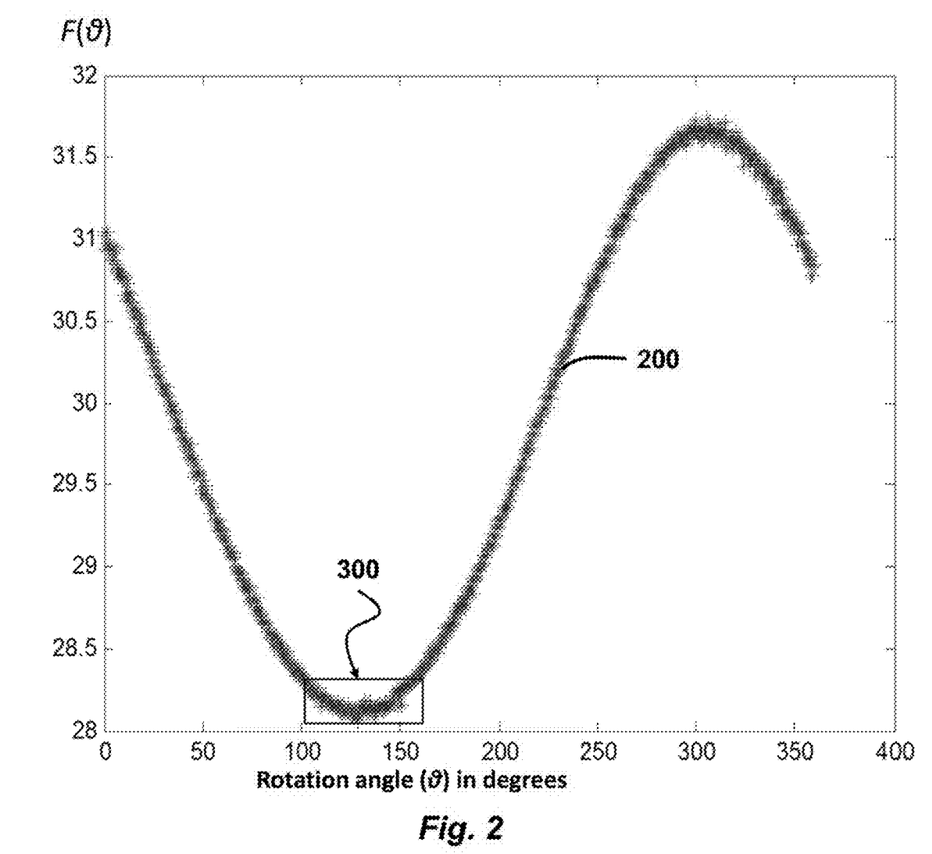
FIG. 2 is a graph of spatial frequency $F(\theta)$ with the rotation angle according to embodiments of the invention.

FIG. 2 shows an example 200 of estimated F($\theta$) with rotation angle over one full rotation.

Figure 3:
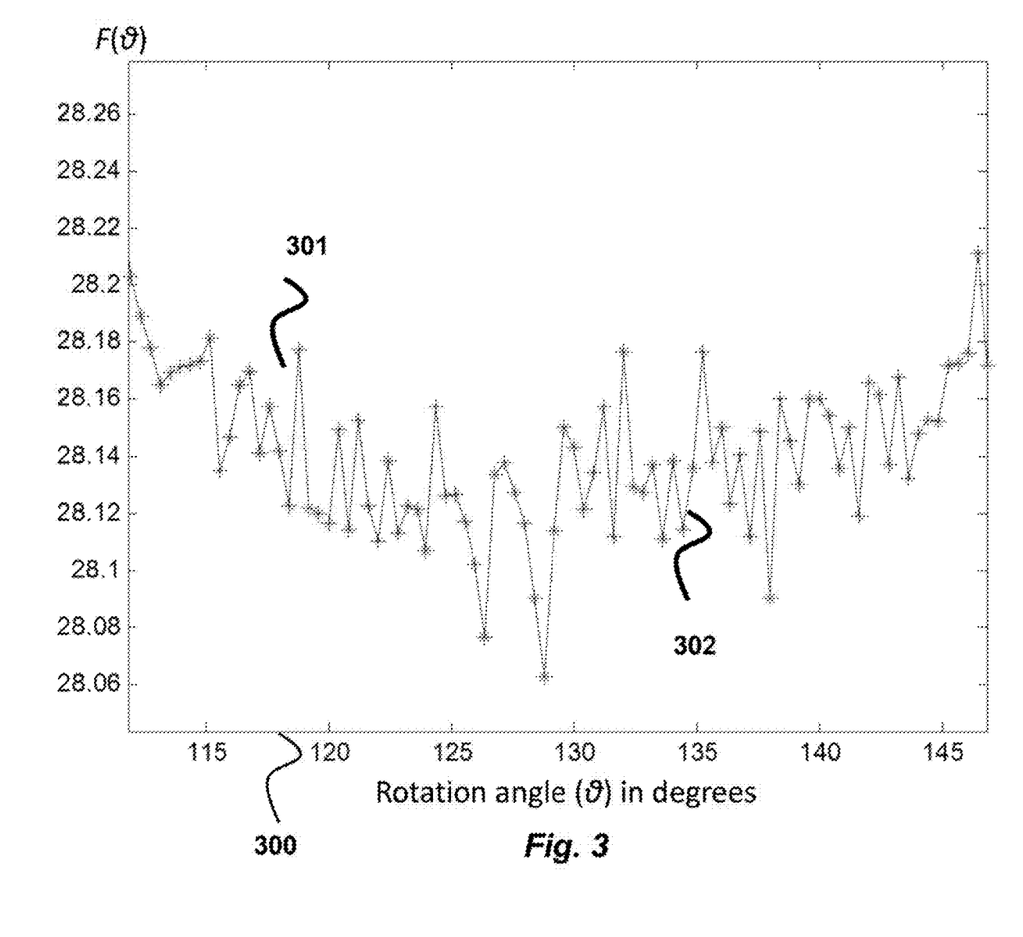
FIG. 3 is a graph of spatial frequency variations due to noise according, to embodiments of the invention.

FIG. 3 shows frequency variations 300 in more details. The high frequency variations 301 are due to noise. The low frequency variations 302 are due to eccentricity wobble and gap change. It is an object of the invention to correct for these variations.

During the self-calibration process, these variations are modeled using a parametric function. The shaft with the scale is rotated a full (360°) or partial rotation (<360°), and the encoder scale is sampled at several locations. For example, the scale can be rotated every 2°, and sensor images corresponding to angles are stored in the memory.

For all these angles, the estimated values of frequency and distortion parameters are stored along with estimated encoder phase P.

Curve Fitting

A suitable parametric function or spline is used for modeling the variations in frequency and distortion parameters using least squares fitting.

Figure 4:
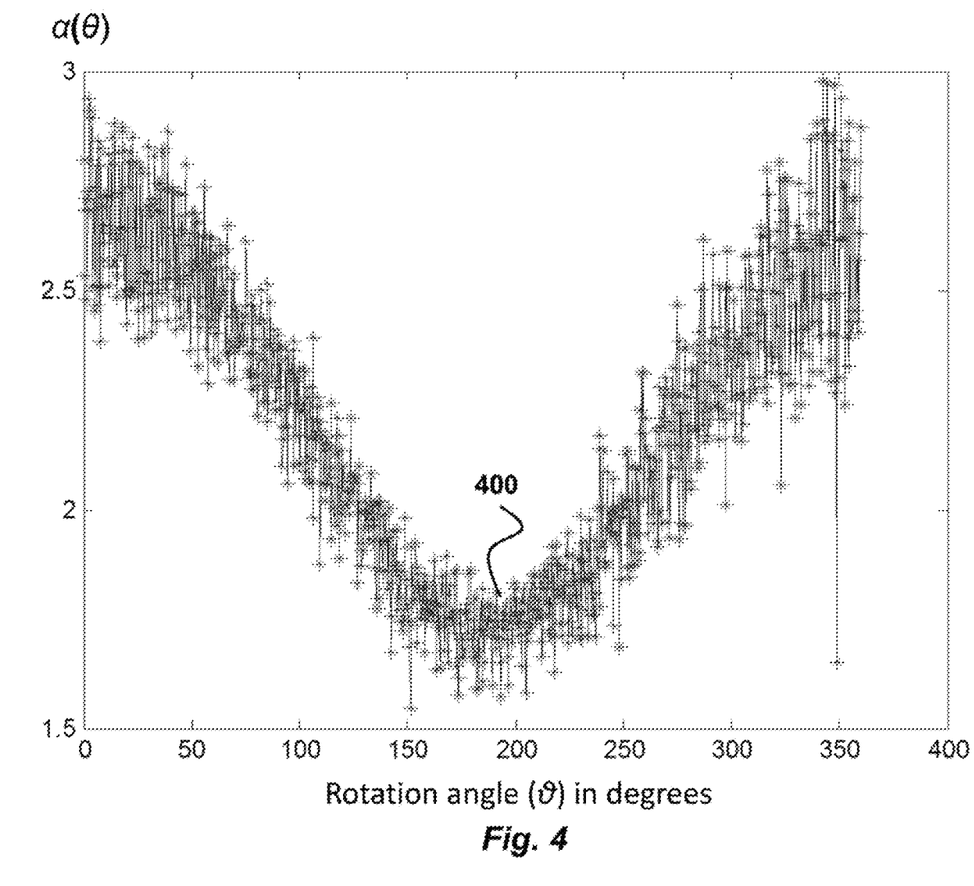
FIG. 4 is a graph of variations in spatial distortion parameter $\alpha(\theta)$ with the rotational angle according to embodiments of the invention.
Figure 5:
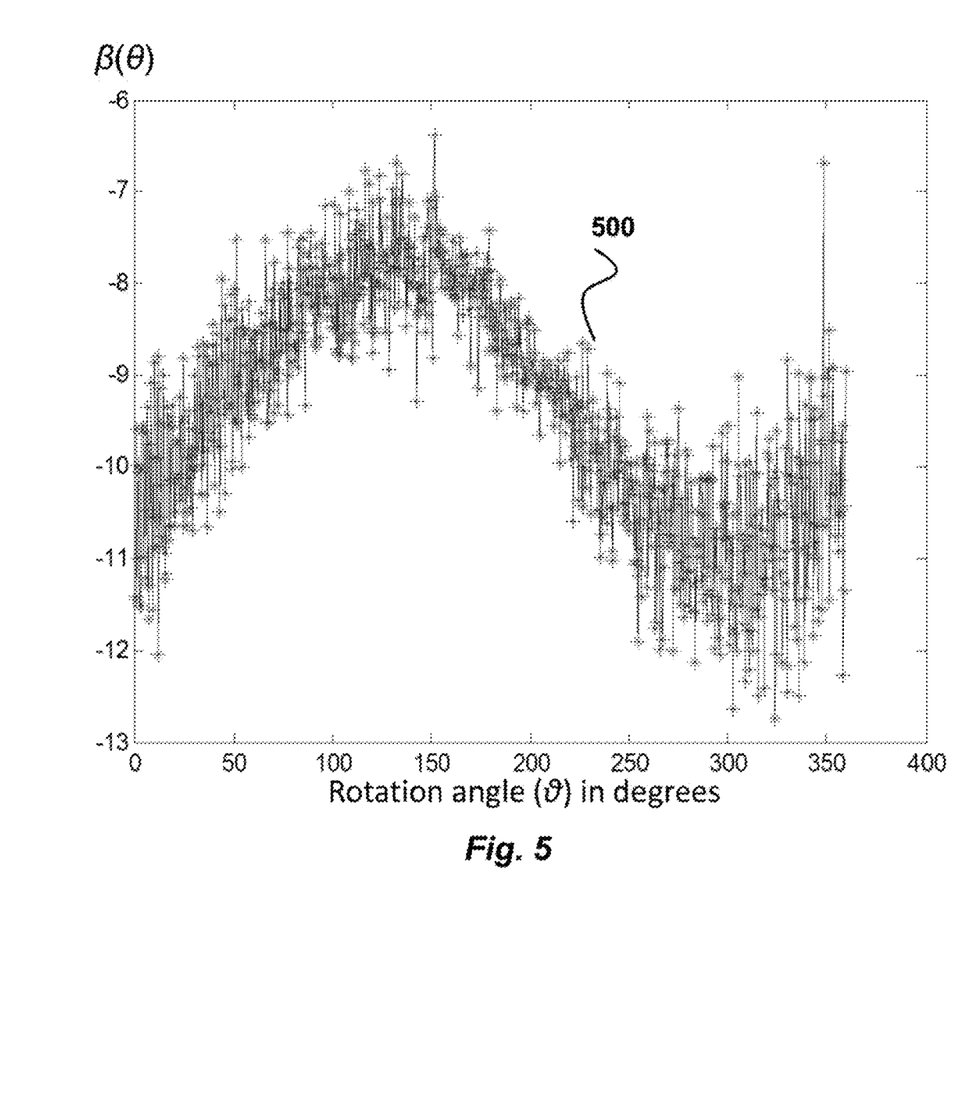
FIG. 5 is a graph of variations in spatial distortion parameter $\beta(\theta$ with the rotation angle according to embodiments of the invention.
Figure 6:
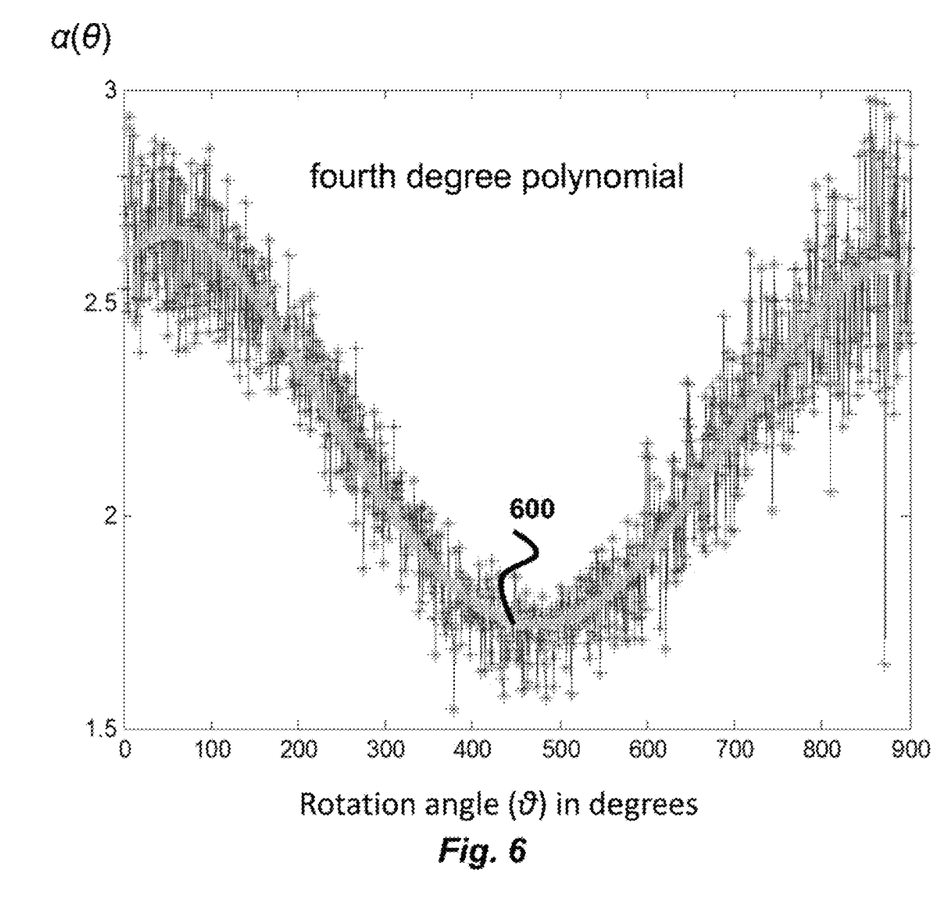
FIG. 6 is a graph of a fourth degree polynomial fitted to $\alpha(\theta)$ according to embodiments of the invention.

FIG. 4 shows the variation in $\alpha(\theta)$ 400, which can be modeled using a fourth degree polynomial model with respect to the rotational angle $\theta$ $$\alpha(\theta)=t_1+t_2\theta+t_3\theta^2+t_4\theta^3+t_5\theta^4,$$

where $t_1$, $t_2$, $t_3$, $t_4$, and $t_5$ are model parameters. The model parameters are estimated using, the least square fitting of estimated $\alpha(\theta)$. FIG. 5 shows the variation 500 for $\beta(\theta)$. Note that the model degree or form need not be same for all three parameters. For example, the frequency F($\theta$) can be modeled using a spline basis function, and $\alpha(\theta)$ and $\beta(\theta)$ can be modeled using polynomial functions. FIG. 6 shows the estimated $\alpha(\theta)$ fitted to a fourth degree polynomial 600 for the full rotation. After curve fitting, the model parameters are stored in a memory of the DSP 115.

Operation

During encoder operation, the last encoder position can be used to determine the value of frequency and spatial distortion parameters for the current position. These values are used to determine the phase P. Alternatively, the frequency and distortion parameters can be iteratively determined along with the phase. This is useful at startup, where the last encoder phase is unknown or invalid. A first estimate of current rotation angle, frequency and distortion parameters can be obtained as described above. Using the estimated rotation angle $\theta$, the parameters F, $\alpha$ and $\beta$ for current position are re-determined using their respective models. Then the new value of these parameters is used to re-determine the phase P.

In U.S. Pat. No. 7,825,367 to Nakamura, the self-calibration is based on rotation angles at two different locations, and analyzing the difference for the self-calibration, and use it for calibration. Nakamura does not describe spatial frequency and distortion parameters. The encoder according to the invention is not based on the actual rotation angle as in Nakamura, but rather on the underlying frequency and distortion parameters that are used for modeling the zero-crossings at a particular rotation angle.

Vignetting Correction

Figure 7:
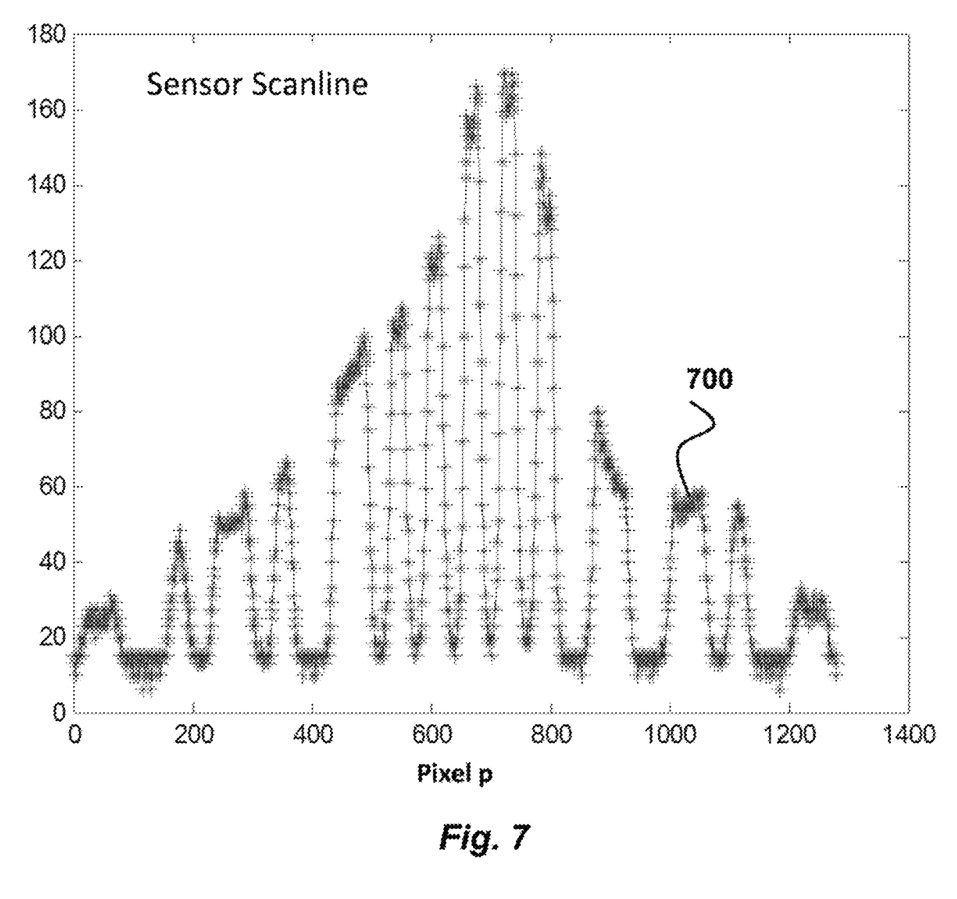
FIG. 7 is a graph of scanline obtained by the 1D sensor and depicts the vignetting

As shown in FIG. 7, vignetting correction can also be performed by acquiring measurements 700 during the rotation of the scale.

Figure 8:
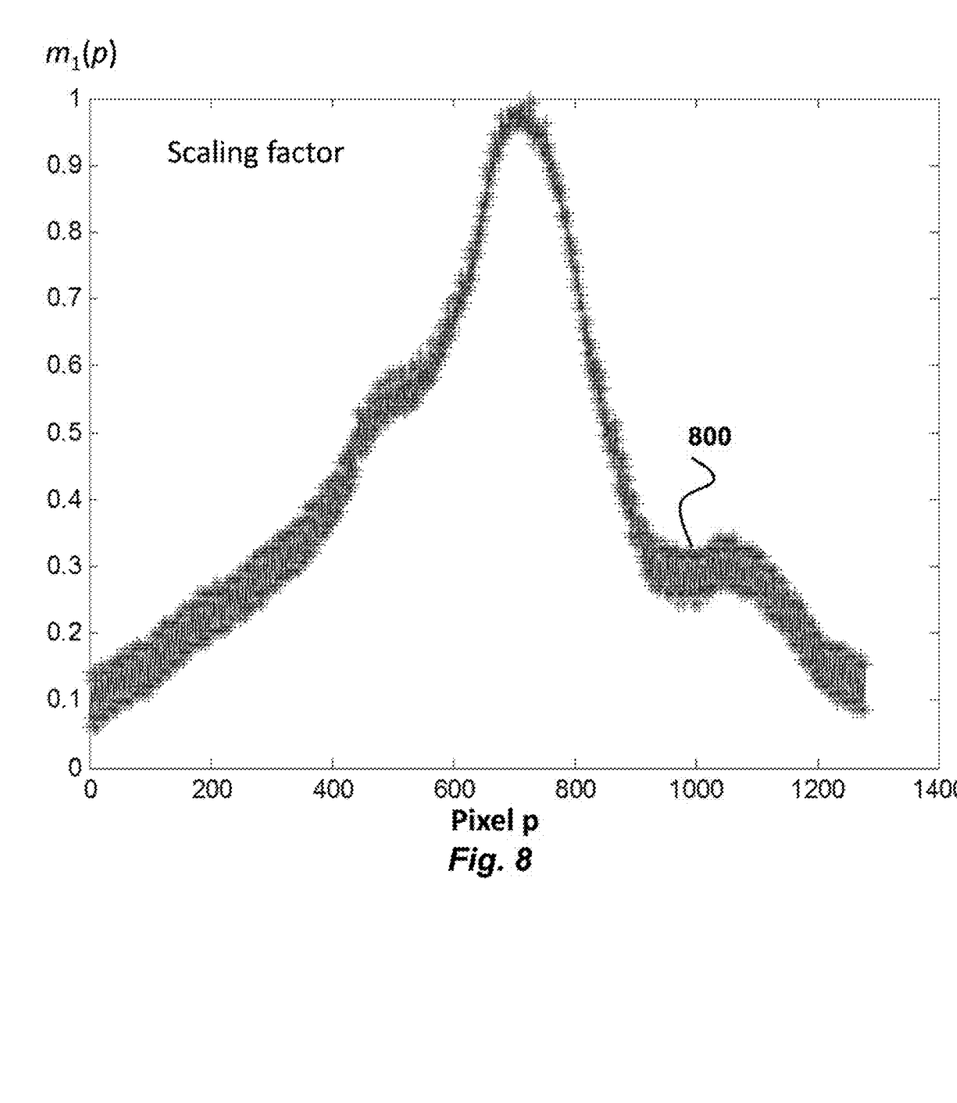
FIG. 8 is a graph of a scaling factor according to embodiments of the invention.
Figure 9:
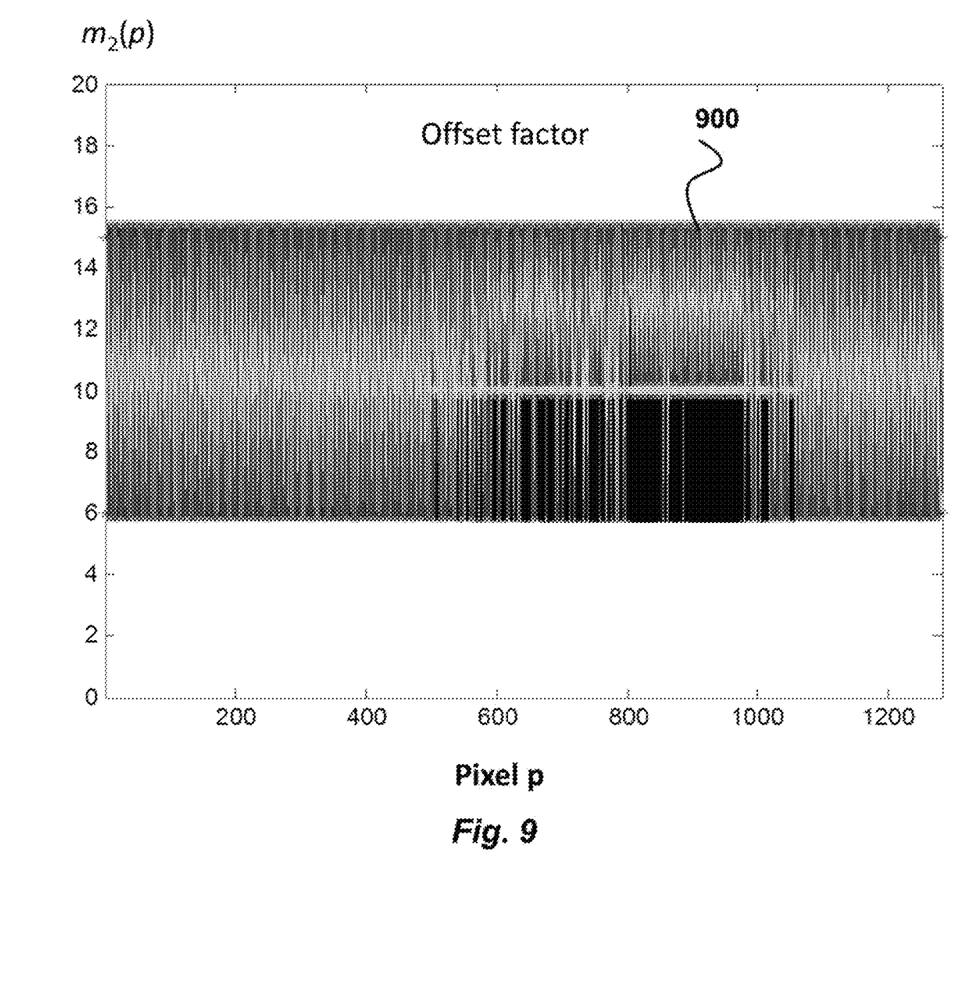
FIG. 9 is a graph of an offset factor according to embodiments of the invention.

As shown in FIG. 8 for each pixel p in the sensor, a maximum pixel value $m_1(p)$ is a scaling factor 800, and as shown in FIG. 9, a minimum pixel value $m_2(p)$ is an offset factor 900. These are used for vignetting correction as follows.

Figure 10:
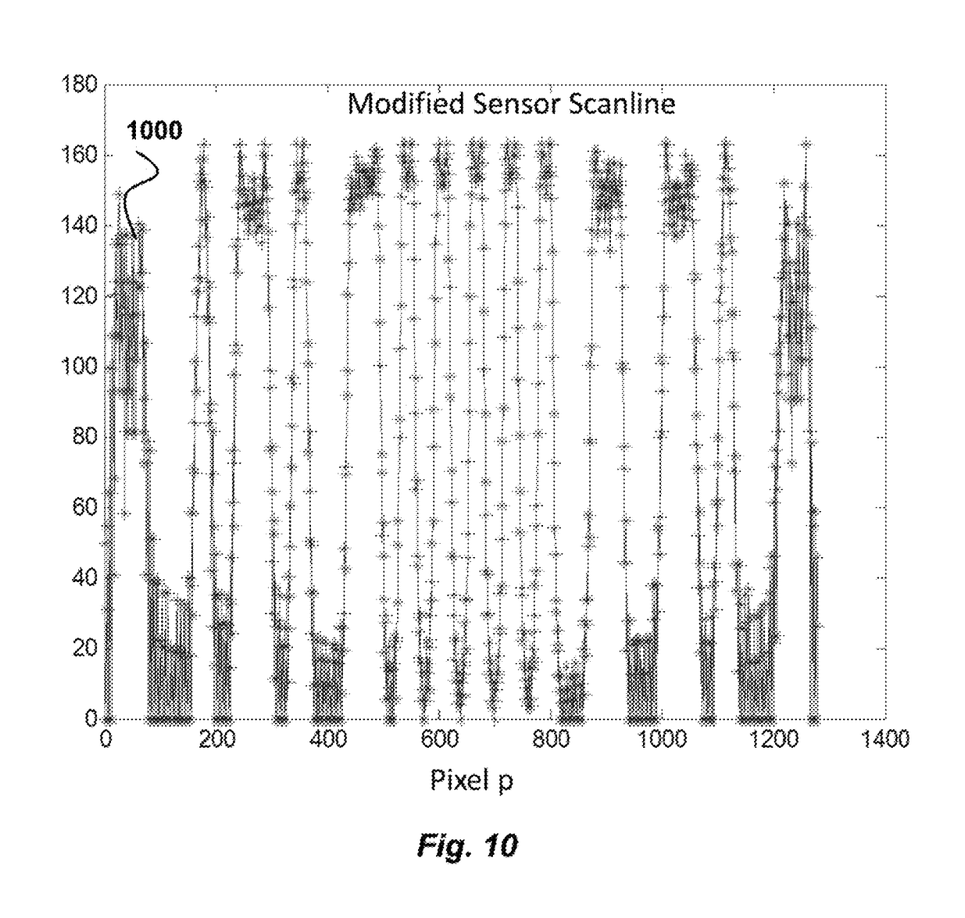
FIG. 10 is a graph of corrected sensor values after applying vignetting correction according to embodiments of the invention.

As shown in FIG. 10 for every position, the sensor values i(p) are modified 1000 as $$i(p) \leftarrow 255*(i(p)=m_2(p))/(m_1(p)-m_2(p))$$

This modification ensures that the minimal intensity of each pixel is set to zero and the maximal intensity of each pixel is set to 255 as the encoder is rotated. This removes the vignetting effect.

The steps of the method to perform self-calibration and vignette correction can be performed in the DSP, or similar microprocessor connected to a memory and input/output interfaces as known in the art.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for self-calibrating a rotary encoder including a single read-head having an imaging sensor and a circular scale having a circle disk, wherein the single read-head reads the circular scale at positions in the circumferential direction of the circle disk and is in communication with a processor, the method comprising the steps of:
    positioning the single read-head at a distance and parallel to a plane of the circular scale;
    acquiring calibration samples by rotating the circular scale past the read-head to obtain calibration samples at different positions along the circumference of the circle disk, wherein each calibration sample by the read-head includes measurements of pixels at positions in the circumferential direction of the circle disk;
    obtaining from each calibration sample a set of edge locations on the circular scale; and
    estimating spatial frequency and spatial distortion parameters of the encoder from the sets of edge locations of the calibration samples for self-calibrating the rotary encoder, wherein the steps are performed in the processor.

2. The method of claim 1, further comprising:
    determining a phase of the encoder using the estimated frequency and distortion parameters.

3. The method of claim 1, wherein estimating spatial frequency and spatial distortion parameters of the encoder from the sets of edge locations or zero-crossings of the calibration samples for self-calibrating the rotary encoder, further comprises:
    modeling variations in the frequency and the distortion parameters using a parametric function.

4. The method of claim 3, wherein the parametric function is a spline.

5. The method of claim 3, wherein the parametric function uses least squares fitting between the parametric function and the zero-crossings.

6. The method of claim 5, further comprising:
    measuring c bits between two successive zero-crossing on the circular scale; and
    modeling the zero-crossings as $$z(i) = P + Fc(i) + \alpha c(i)^2 + \beta c(i)^3,$$

wherein P is a phase value, F is the spatial frequency, and $\alpha$ and $\beta$ are the spatial distortion parameters.

7. The method of claim 6, wherein the spatial frequency parameters is $F(\theta)$, and the spatial distortion parameters are $\alpha$ and $\beta$, and wherein a fourth degree polynomial is $$\alpha(\theta) = t_1 + t_2\theta + t_3\theta^2 + t_4\theta^3 + t_5\theta^4,$$

where $t_1$, $t_2$, $t_3$, $t_4$, and $t_5$ are parameters of the fourth degree polynomial estimated using the least square fitting.

8. The method of claim 3, wherein the parametric function is a fourth degree polynomial with respect to the rotational angle.

9. The method of claim 1, wherein marks on the circular scale are arranged as sectors, and the read-head is centered tangentially at an offset with respect to a center of rotation of the circular scale.

10. The method of claim 1, wherein the read-head data is obtained for a rotation angle of 360 degrees or less.

11. The method of claim 1, further comprising: storing the frequency and distortion parameters in a memory as a look-up table.

12. The method of claim 1, wherein the frequency and distortion parameters correct for eccentricity of the circular scale.

13. The method of claim 1, wherein the frequency and distortion parameters correct for wobble of the circular scale.

14. The method of claim 1, wherein the frequency and distortion parameters correct for a change in a distance between the read-head and the circular scale.

15. The method of claim 1, wherein the frequency and distortion parameters correct for a temperature or mechanical vibration during operation of the encoders.

16. The method of claim 1, wherein the frequency and distortion parameters are acquired during real-time operation of the encoder.

17. The method of claim 1, wherein the read-head includes a linear array of pixels, and further comprising:
    measuring intensities of the pixels to obtain a maximal intensity as a scaling factor, and a minimal intensity as an offset factor.

18. The method of claim 17, wherein the pixel intensities are modified using the scaling and offset factor.

19. The method of claim 17, wherein the pixel intensities $i(p)$ are modified according to $$i(p) \leftarrow 255 * (i(p) - m_2(p))/(m_1(p) - m_2(p))$$

wherein $m_1(p)$ is the maximal intensity and $m_2(p)$ is the minimal intensity.

20. The method of claim 1, wherein the circular scale is a form of a de Bruijn sequence.

* * * * *